United States Patent [19]
Cen

[11] Patent Number: 5,739,862
[45] Date of Patent: Apr. 14, 1998

[54] REVERSE PLAYBACK OF MPEG VIDEO

[75] Inventor: Shanwei Cen, Aloha, Oreg.

[73] Assignee: Tektronix, Inc., Wilsonville, Oreg.

[21] Appl. No.: 774,291

[22] Filed: Dec. 23, 1996

[51] Int. Cl.$^6$ ........................................... H04N 7/36
[52] U.S. Cl. .................... 348/402; 348/413; 348/416; 348/716; 348/718
[58] Field of Search ...................... 348/384, 402, 348/426, 465, 466, 413, 416, 716, 718; 386/27, 33, 109, 112; H04N 7/36

[56] References Cited

U.S. PATENT DOCUMENTS

| | | | |
|---|---|---|---|
| 4,942,465 | 7/1990 | Ohta | 348/413 |
| 5,253,053 | 10/1993 | Chu et al. | 348/384 |
| 5,267,334 | 11/1993 | Normille et al. | 382/56 |
| 5,461,679 | 10/1995 | Normile et al. | 382/304 |
| 5,481,312 | 1/1996 | Cash et al. | 348/466 |
| 5,510,842 | 4/1996 | Phillips et al. | 348/426 |
| 5,510,844 | 4/1996 | Cash et al. | 348/465 |
| 5,521,630 | 5/1996 | Chen | 348/7 |

FOREIGN PATENT DOCUMENTS

| | | | |
|---|---|---|---|
| 0676898 | 3/1995 | European Pat. Off. | H04N 7/173 |
| 0702493 | 8/1995 | European Pat. Off. | H04N 7/24 |

OTHER PUBLICATIONS

Proceedings of the International Conference on Multimedia Computing and Systems May 15–18, 1995 Washington D.C. IEEE Computer Society Press.

Primary Examiner—Howard W. Britton
Attorney, Agent, or Firm—Francis I. Gray

[57] ABSTRACT

Reverse playback of MPEG video from a random access source takes advantage of the symmetry of B frames within an IB data stream. The IB data stream is processed by a parsing algorithm to identify within the B frames during playback those bits associated with motion vector identification and values to develop a parsed B frame table. When the IB data stream is output from the storage source for reverse playback, the IB data stream is rearranged into a reversed IB data stream. As each B frame is processed prior to input to an MPEG decoder, the parsed B frame table is used to manipulate the appropriate bits within the B frames to turn forward motion vectors into backward motion vectors, and vice versa. Then when the B frame is decoded by the MPEG decoder the respective motion vectors are associated with the appropriate I frames within the reversed IB data stream to produce accurate decoding of the B frames during reverse playback. Alternatively the MPEG decoder controller may be modified to provide both forward and reverse playback capabilities by reversing the stores within a prediction module of the MPEG decoder so that for reverse playback the first I frame in the reversed IB data stream is input to a future store rather than a prior store and the next I frame is input to the prior store rather than the future store. Again the B frame motion vectors in this manner are associated with the proper I frames for decoding.

2 Claims, 6 Drawing Sheets

| MACROBLOCK_ TYPE VLC CODE | MACROBLOCK_ QUANT | MACROBLOCK_ MOTION_ FORWARD | MACROBLOCK_ MOTION_ BACKWARD | MACROBLOCK_ PATTERN | MACROBLOCK_ INTRA |
|---|---|---|---|---|---|
| 10 | 0 | 1 | 1 | 0 | 0 |
| 11 | 0 | 1 | 1 | 1 | 0 |
| 010 | 0 | 0 | 1 | 0 | 0 |
| 011 | 0 | 0 | 1 | 1 | 0 |
| 0010 | 0 | 1 | 0 | 0 | 0 |
| 0011 | 0 | 1 | 0 | 1 | 0 |
| 00011 | 0 | 0 | 0 | 0 | 1 |
| 00010 | 1 | 1 | 1 | 1 | 0 |
| 000011 | 1 | 1 | 0 | 1 | 0 |
| 000010 | 1 | 0 | 1 | 1 | 0 |
| 000001 | 1 | 0 | 0 | 0 | 1 |

| SYNTAX | NO. OF BITS | MNEMONIC |
|---|---|---|
| PICTURE() { | | |
|   PICTURE_START_CODE | 32 | BSLBF |
|   TEMPORAL_REFERENCE | 10 | UIMSBF |
|   PICTURE_CODING_TYPE | 3 | UIMSBF |
|   VBV_DELAY | 16 | UIMSBF |
|   IF(PICTURE_CODING_TYPE==2) \|\| (PICTURE_CODING_TYPE==3)) { | | |
|     FULL_PEL_FORWARD_VECTOR | 1 | |
|     FORWARD_F_CODE | 3 | UIMSBF |
|   } | | |
|   IF(PICTURE_CODING_TYPE==3) { | | |
|     FULL_PEL_FORWARD_VECTOR | 1 | |
|     BACKWARD_F_CODE | 3 | UIMSBF |
|   } | | |
|   WHILE(NEXTBITS()=='1') { | | |
|     EXTRA_BIT_PICTURE | 1 | "1" |
|     EXTRA_INFORMATION_PICTURE | 8 | |
|   } | | |
|   EXTRA_BIT_PICTURE | 1 | "0" |
|   NEXT_START_CODE() | | |

```
FROM FIG.2A {
    IF(NEXTBITS()==EXTENSION_START_CODE) {
        EXTENSION_START_CODE                                    32    BSLBF
        WHILE(NEXTBITS() !='0000 0000 0000 0000 0000 0001') {
            PICTURE_EXTENSION_DATA                              8
        }
        NEXT_START_CODE()
    }
    IF(NEXTBITS()==USER_DATA_START_CODE) {
        USER_DATA_START_CODE                                    32    BSLBF
        WHILE(NEXTBITS() !='0000 0000 0000 0000 0000 0001') {
            USER_DATA                                           8
        }
        NEXT_START_CODE()
    }
    DO {
        SLICE()
    } WHILE(NEXTBITS()==SLICE_START_CODE)
}
```

FIG.2B

| SYNTAX | NO. OF BITS | MNEMONIC |
|---|---|---|
| MACROBLOCK() { | | |
|   WHILE(NEXTBITS()=='0000 0001 111') | | |
|     MACROBLOCK_STUFFING | 11 | VLCLBF |
|   WHILE(NEXTBITS()=='0000 0001 000') | | |
|     MACROBLOCK_ESCAPE | 11 | VLCLBF |
|   MACROBLOCK_ADDRESS_INCREMENT | 1-11 | VLCLBF |
|   MACROBLOCK_TYPE | 1-6 | VLCLBF |
|   IF(MACROBLOCK_QUANT) | | |
|     QUANTIZER_SCALE | 5 | UIMSBF |
|   IF(MACROBLOCK_MOTION_FORWARD) { | | |
|     MOTION_HORIZONTAL_FORWARD_CODE | 1-11 | VLCLBF |
|     IF( (FORWARD_F!=1)&& | | |
|       (MOTION_HORIZONTAL_FORWARD_CODE!=0) ) | | |
|       MOTION_HORIZONTAL_FORWARD_R | 1-6 | UIMSBF |
|     MOTION_VERTICAL_FORWARD_CODE | 1-11 | VLCLBF |
|     IF( (FORWARD_F!=1)&& | | |
|       (MOTION_VERTICAL_FORWARD_CODE!=0) ) | | |
|       MOTION_VERTICAL_FORWARD_R | 1-6 | UIMSBF |

```
FROM FIG.3A
)
IF(MACROBLOCK_MOTION_BACKWARD) (
    MOTION_HORIZONTAL_BACKWARD_CODE                              1-11    VLCLBF
    IF(BACKWARD_F!=1)&&
        (MOTION_HORIZONTAL_BACKWARD_CODE!=0) )
            MOTION_HORIZONTAL_BACKWARD_R                          1-6     UIMSBF
    MOTION_VERTICAL_BACKWARD_CODE                                1-11    VLCLBF
    IF( (BACKWARD_F!=1)&&
        (MOTION_VERTICAL_BACKWARD_CODE!=0) )
            MOTION_VERTICAL_BACKWARD_R                            1-6     UIMSBF
)
IF(MACROBLOCK_PATTERN)
    CODED_BLOCK_PATTERN                                          3-9     VLCLBF
FOR(I=0; I<6; I++)
    BLOCK(I)
IF(PICTURE_CODING_TYPE==4)
    END_OF_MACROBLOCK                                             1      "1"
)
```

FIG.3B

| MACROBLOCK_TYPE VLC CODE | MACROBLOCK_QUANT | MACROBLOCK_MOTION_FORWARD | MACROBLOCK_MOTION_BACKWARD | MACROBLOCK_PATTERN | MACROBLOCK_INTRA |
|---|---|---|---|---|---|
| 10 | 0 | 1 | 1 | 0 | 0 |
| 11 | 0 | 1 | 1 | 1 | 0 |
| 010 | 0 | 0 | 1 | 0 | 0 |
| 011 | 0 | 0 | 1 | 1 | 0 |
| 0010 | 0 | 1 | 0 | 0 | 0 |
| 0011 | 0 | 1 | 0 | 1 | 0 |
| 00011 | 1 | 1 | 1 | 1 | 0 |
| 00010 | 1 | 0 | 0 | 1 | 0 |
| 000011 | 1 | 1 | 1 | 1 | 0 |
| 000010 | 1 | 0 | 0 | 1 | 0 |
| 000001 | 1 | 0 | 0 | 0 | 1 |

FIG.4

REVERSE PLAYBACK OF MPEG VIDEO

BACKGROUND OF THE INVENTION

The present invention relates to compressed video, and more particularly to the reverse playback of MPEG video which is in the form of an IB data stream.

Compression techniques are important in processing digital video signals due to the large storage required for uncompressed digital video and due to the network bandwidth that does not allow for realtime video transmission of uncompressed video. The ISO/IEC International Standard 11172 of November 1992 established the MPEG standard that is becoming the prevalent standard for compressed video and audio. An MPEG data stream contains three types of frames—intra frames (I), predictive frames (P) and interpolated frames (B). I frames are coded to be independent of any other frames in the sequence, similar to the prior JPEG compression standard. P frames are coded using motion estimation and are dependent on the preceding P or I frame. B frames are dependent upon two "anchor" frames, the preceding I/P frame and the succeeding I/P frame. Since the B and P frames use inter-frame compression, they are smaller than I frames. Therefore the MPEG standard produces greater compression than the JPEG standard with concomitant savings in storage space and network bandwidth. An MPEG data stream contains a sequence of picture frames in temporal order as follows:

I0, B1, B2, P3, B4, B5, P6, B7, B8, I9 where P3 is dependent upon I0, P6 is dependent upon P3, B1 and B2 are dependent upon both I0 and P3, B4 and B5 are dependent upon both P3 and P6, and B7 and B8 are dependent upon both P6 and I9. To simplify buffering at the decoder, the decoder has to have the frames presented in a suitable order, i.e., a frame is presented only after all frames upon which it depends are presented so that the above sequence of frames is reordered as follows:

I0, P3, B1, B2, P6, B4, B5, I9, B7, B8.

For an MPEG IB data stream there are no P frames, and each P frame in the above sequence is replaced with an I frame.

The above relates to playing the video in a forward direction. However in editing and other video processing applications it is desirable to play the video in both the forward and the backward directions. Ming-Syan Chen and Dilip D. Kandlur, in an article entitled "Downloading and Stream Conversion: Supporting Interactive Playout of Videos in a Client Station" published May 15–18, 1995 as part of the Proceedings of the International Conference on Multimedia Computing and Systems by the IEEE Computer Society Press, describe a method of transforming a standard compressed MPEG data stream into a local compressed form at a video player device using a P to I frame conversion. Specifically after a P frame is retrieved, decorepressed and played out, the frame is encoded as an I frame and stored back into secondary storage in the form:

I0, I*3, B1, B2, I*6, B4, B5, I9, B7, B8 where I*3 and I*6 are converted P frames. For reverse playback the frames are reversed before being input to the decoder:

I9, I6, B8, B7, I3, B5, B4, I0, B2, B1 to provide a playback display in the following temporal order:

I9, B8, B7, I6, B5, B4, I3, B2, B1, I0.

Although the amount of secondary storage required for this methodology is small compared to that required for MPEG to JPEG conversion, i.e., all I flames, there is still the requirement for such extra storage which makes for a special MPEG decoder rather than using a commodity MPEG decoder that has no capability, in itself, for playing in reverse.

What is desired is another methodology of reverse playback of MPEG video in the form of IB data streams that does not have secondary storage requirements and that uses a commodity MPEG decoder.

SUMMARY OF THE INVENTION

Accordingly the present invention provides for reverse playback of MPEG video that is in the form of an IB data stream which takes advantage of the symmetry of the B frames within the stream. A first implementation is to reverse the motion vectors within each B frame when the IB stream is played back from a random access video source, such as a digital disk recorder, so that forward motion vectors become reverse motion vectors, and vice versa. When the picture type in a picture layer is indicated as being a B frame, the motion vector bits in the picture layer are swapped forward for reverse, and vice versa. At a macroblock layer the macroblock type is changed to reflect the reversal of forward and reverse motion vectors, which may result in adding or deleting bits as well, and the motion vector bits themselves are swapped forward for reverse, and vice versa. In this manner the motion vectors are associated with the appropriate I frames when in the reverse playback mode and may be decoded by a commodity MPEG decoder.

Alternatively the control system for the commodity MPEG decoder may be changed to provide a reverse playback capability by reversing the frame/field stores in which the I frames are stored. In other words the first I frame in the IB stream is stored in a future store rather than a previous store and the second I frame is stored in the previous store so that the motion vectors from the B frames are associated with the correct I frame during decoding.

The objects, advantages and other novel features of the present invention are apparent from the following detailed description when read in conjunction with the appended claims and the attached drawing.

BRIEF DESCRIPTION OF THE DRAWING

FIG. 2 is a table view of a picture layer syntax for the MPEG standard.

FIG. 3 is a table view of a macroblock layer syntax for the MPEG standard.

FIG. 4 is a table view of the variable length codes for macroblock_type of B-pictures within the macroblock layer syntax.

DESCRIPTION OF THE PREFERRED EMBODIMENT

Figure 1:
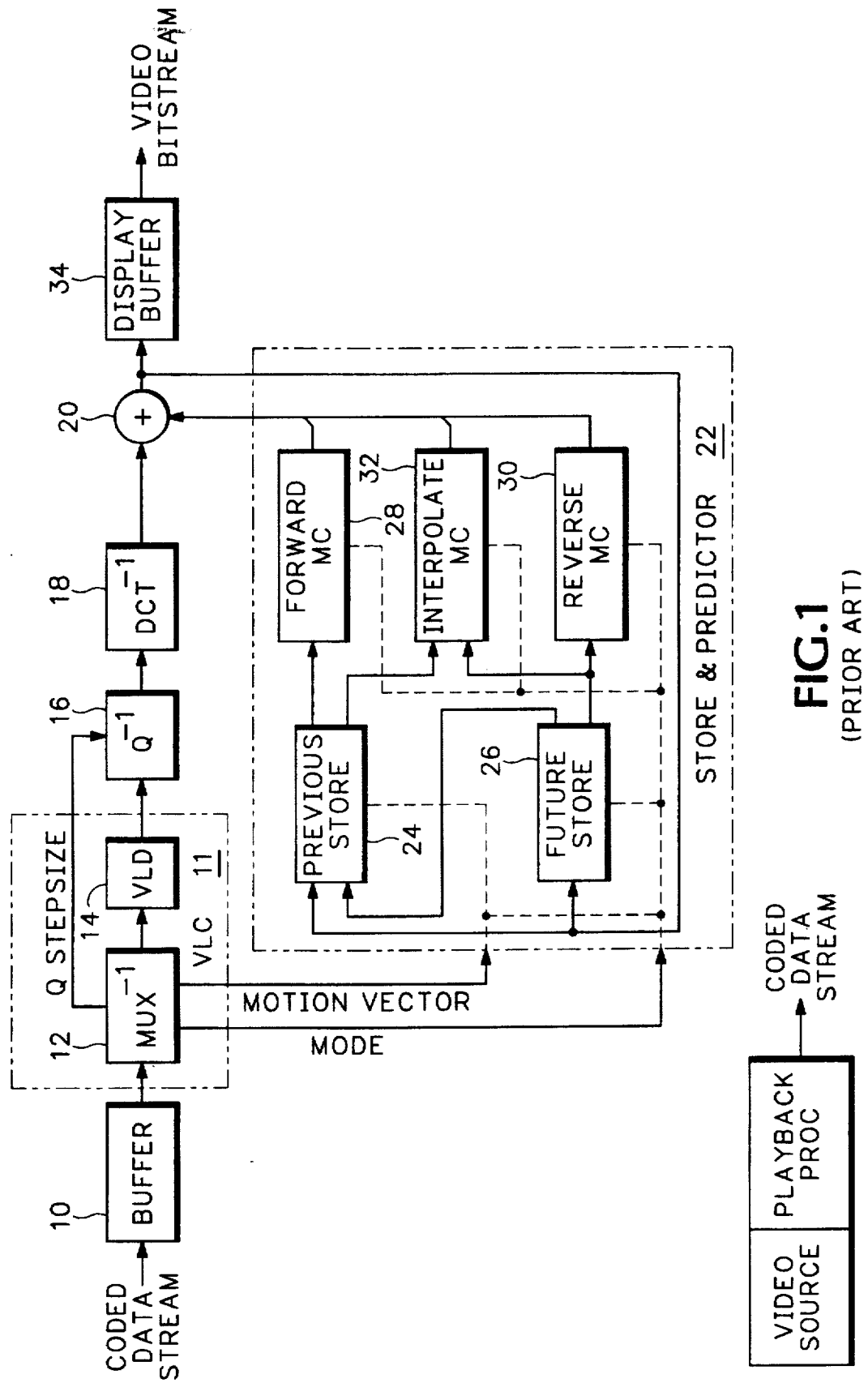
FIG. 1 is a block diagram view of a system for reverse playback of MPEG video according to the present invention using a commodity MPEG decoder.

Referring now to FIG. 1 an MPEG IB coded data stream is accumulated in an input buffer 10 until needed. A variable length code (VLC) decoder 11 includes a demultiplexer 12 which extracts from a sequencer header within the data stream stored in the input buffer 10 a set of quantizer step size values, from a picture layer within the data stream a picture encoding type (I, P, B) and from a macroblock layer a motion vector, if any, for each block within the frame. The VLC decoder 11 further includes a variable length decoder 14 that produces from the picture data within the data stream quantized coefficients corresponding to quantized DCT coefficients. The quantized coefficients are then input to an inverse quantizer 16 where the actual DCT coefficients are produced using the quantization step size values. The output from the inverse quantizer 16 is input to an inverse discrete cosine transform (DCT) function 18 to produce actual pixel values for I frames and pixel difference values for P and B frames. The output from the inverse DCT 18 is input to an adder 20 where motion predicted pixel values are added to the difference pixel values for P and B frames. The decoded video from the adder 20 is input to a store and predictor module 22, to which also is input the picture type and the corresponding motion vector. The store/predictor 22 includes prior and future frame stores 24, 26 and the decoded video is stored in one of the frame stores as an anchor frame for I and P frames. For example the first I frame is stored in the prior frame store 24 and the next I/P frame is stored in the future frame store 26. When the third I/P frame is decoded, it is stored in the future frame store 26 and the contents of the future frame store are transferred to the prior frame store 24. Depending upon the picture encoding type for the current picture, the anchor frames from the frame stores 24, 26 are input to a forward motion corrector 28, a reverse motion corrector 30 and an interpolation motion corrector 32. The output from a particular one of the motion correctors 28, 30, 32 is also input to the adder 20 for combination with the current pixel difference values to provide a decoded frame for P and B frames. The output from the adder 20 is input to a picture reorder, or display buffer, circuit 34 to provide the decoded pictures in the correct temporal order as a video data stream for display. The picture type and motion vectors are input to a controller (not shown) which provides appropriate control to the various elements within the store/predictor circuit 22, as is well known in the art, in order to decode the picture properly.

In operation for an MPEG IB data stream the VLC decoder 11 decodes the header of the first picture and determines that it is an I-picture. The resulting pixels from the inverse DCT 18 are stored in the prior store 24 as an anchor frame and in the display buffer 34. The next picture also is an I-picture, so it also is decoded and stored in the future store 26 as an anchor frame and also in the display buffer 34. The next picture is a B-picture. For each macroblock of the B-picture the VLC decoder 11 decodes the motion vectors that give the displacement from the stored previous or future pictures or both for each block within the corresponding macroblock, and the quantized coefficients corresponding to the quantized DCT coefficients of the difference blocks in the macroblock. These quantized coefficients are inverse quantized and then inverse transformed into difference pixel values and added to the predicted block produced by applying the motion vectors to the stored anchor frames. The resultant macroblock, or decoded picture, is stored in the display buffer 34. When the next I-picture is determined, the picture in the future store 26 is copied into the previous store 24 and decoding proceeds as discussed above. The video stream from the display buffer 34 has the pictures in the proper temporal order.

The picture layer syntax for MPEG, as shown in FIG. 2, has a fixed number of defined initial bits that includes the picture mode, which are then followed by motion vector decoding information for both forward (P and B frames) and backward (B frames) motion vectors. The macroblock layer syntax, as shown in FIG. 3, includes the forward and backward motion vector information, if required for decoding that particular macroblock. A macroblock type variable field, having values as indicated in FIG. 4, indicates what motion vectors are included for that macroblock, and then the appropriate variable length motion vector information follows.

For backward play of the MPEG IB data stream the picture order needs to be reversed so that the sequence presented to the decoder becomes: I6, I3, B5, B4, I0, B2, B1. However just playing the data stream in reverse order is not sufficient. For example the forward motion vector for B5 was generated with respect to I3, but the decoder in the backward play will use the forward motion vector from B5 and apply it to I6. This produces erroneous results. Therefore as the B-picture is read from the video source, such as a digital disk recorder, in the picture layer the bits for full_pel_forward_vector and forward_f_code are swapped with the bits for full_pel_backward_vector and backward_f_code. Likewise in the macroblock layer the macroblock_type is changed to indicate backward motion where previously it indicated forward motion, and vice versa. Specifically, referring to FIG. 4, 010 is changed to 0010, and vice versa, 011 is changed to 0011, and vice versa, and 000011 is changed to 000010, and vice versa. The bits associated with motion_horizontal_forward_code and motion_vertical_forward_code are swapped with those associated with motion_horizontal_backward_code and motion_vertical_backward_code. In this way the forward motion vector for B5 becomes a backward motion vector so that it still is associated with I3, and vice versa with respect to I6. With the bits for the motion vectors rearranged in this manner, when the IB data stream is decoded the reverse playback appears as expected without anomalies while using the commodity MPEG decoder described above.

The data in the coded data stream is in the form of 8-bit words and processed in word or word multiple segments rather than bits. Therefore during reverse play the playback driver, as the data is recorded, parses each B-frame to build a parse table which determines where the pertinent bits are within the data stream in terms of words plus a bit offset. The B-picture from the IB data stream is copied into the input buffer according to the parse table. The parse table is used to do bit swapping as well as adding or deleting a bit, as necessary.

Alternatively the MPEG decoder may be altered to add the reverse playback capability. For reverse playback instead of storing the first I-picture, I6, in the prior store 24, it is stored in the future store 26 and the next I-picture, I3, is stored in the prior store. Then when the subsequent B-picture, B5 or B4, is processed the forward motion vector correction is made with respect to the prior store 24 which is now I3, which is the correct I-picture for that motion vector. Thus the control for the commodity MPEG decoder is altered to provide reverse playback by reversing the order in which the I flames are stored in the prior/future frame stores 24, 26.

Although for illustration an MPEG IB coded data stream is shown having two B-flames between consecutive I-flames, any arbitrary number of B-flames may exist between I-frames and be played back according to the above described techniques, such as IBBIBBBBIBII . . .

Also the above described techniques may be applied to an MPEG2 coded data stream. Since MPEG2 is more complex, having both frames and fields, the commodity MPEG2 decoder has more than two buffers to hold up to four anchor fields, i.e., the prior store 24 and the future store 26 are each two field stores to store a total of four anchor fields from the I-frames. From the anchor fields the predicted B-field pixel values are derived for addition to the difference field pixel values in the adder 20.

Finally for speed variation during either forward or reverse play, various frames of the IB sequence are dropped from the display order for faster speed and dummy B frames replicating the immediately preceding frame, either I or B, are added to the display order for slower speed.

Thus the present invention provides reverse playback for an MPEG IB data stream by either reversing the motion vector bits and indicators within the B frames when played back in reverse order, or by reversing the frame/field store buffers in a commodity MPEG decoder for loading of the I frames when played back in reverse order.

What is claimed is:

1. A method of reverse playback of an MPEG IB data stream from a random access source comprising the steps of:

providing the MPEG IB data stream from the random access source in reverse playback sequence to produce a reversed MPEG data stream;

detecting the B frames from the reversed MPEG data stream;

parsing each detected B frame in the MPEG IB data stream to build a motion vector table for B frames within the IB data stream indicating where motion vector bits are located within the B frames;

for each detected B frame reversing an identity of a motion vector from forward to backward, and vice versa, and swapping data bits representing a forward motion vector with data bits representing a backward motion vector to produce reversed B frames; and providing the reversed B frames as part of the reversed MPEG data stream to an MPEG decoder.

2. A method of providing reverse playback of an MPEG IB data stream using an MPEG decoder having a prior store and a future store for storing two consecutive I frames as anchor frames from the MPEG IB data stream, forward and backward motion vectors from temporally intervening B frames being used to generate motion correction values from the consecutive I frames to recreate a decoded image from the B frames, comprising the steps of:

storing a first I frame of a reversed playback sequence of the MPEG IB data stream in the future store; and storing a second I frame of the reversed playback sequence of the MPEG IB data stream in the previous store;

whereby the MPEG decoder properly associates the motion vectors of the B frames with the appropriate I frames during reverse playback.

* * * * *

UNITED STATES PATENT AND TRADEMARK OFFICE
CERTIFICATE OF CORRECTION

PATENT NO    :  5,739,862
DATED        :  April 14, 1998
INVENTOR(S)  :  Shanwei Cen It is certified that error appears in the above-identified patent and that said Letters Patent is hereby corrected as shown below:

Column 1 after the title insert the following:

"STATEMENT REGARDING FEDERALLY SPONSORED RESEARCH OR DEVELOPMENT

This invention was made with United States Government support under Award No. 70NANB5H1176 by the National Institute of Standards and Technology, Department of Commerce. The United States Government has certain rights in the invention."

Signed and Sealed this

Fifth Day of January, 1999

Attest:

*Attesting Officer*

*Acting Commissioner of Patents and Trademarks*